United States Patent [19]

Young

[11] 4,073,633

[45] Feb. 14, 1978

[54] TOPICAL NITROGEN FERTILIZATION METHOD

[75] Inventor: Donald C. Young, Fullerton, Calif.

[73] Assignee: Union Oil Company of California, Brea, Calif.

[21] Appl. No.: 686,796

[22] Filed: May 17, 1976

[51] Int. Cl.[2] .................................................. C05C 9/00

[52] U.S. Cl. ........................................ 71/28; 71/64 R; 71/64 E; 71/64 F; 71/64 SC

[58] Field of Search ................... 71/1, 28, 64 R, 64 E, 71/64 F, 64 SC

[56] References Cited

U.S. PATENT DOCUMENTS

| | | | |
|---|---|---|---|
| 3,388,989 | 6/1968 | Sor | 71/28 |
| 3,523,018 | 8/1970 | Geissler et al. | 71/28 |
| 3,580,715 | 5/1971 | Dilday | 71/28 |
| 3,617,239 | 11/1971 | Klanica | 71/28 |

*Primary Examiner*—Thomas G. Wyse
*Assistant Examiner*—Ferris H. Lander
*Attorney, Agent, or Firm*—Richard C. Hartman; Dean Sandford; Michael H. Laird

[57] ABSTRACT

Volatilization loss of surface broadcast urea is reduced by combining the urea with an acid generating compound in a concentration sufficient to maintain a neutral or slightly acidic environment in the immediate vicinity of the urea particles.

10 Claims, No Drawings

TOPICAL NITROGEN FERTILIZATION METHOD

BACKGROUND OF THE INVENTION

Urea is one of several nitrogen-containing compounds which find wide application as soil nitrogen supplements. The compounds can be plowed into the soil or injected below the soil surface as liquids or gases. Subsurface application assures that any decomposition products produced by enzymatic or other decomposition are retained in the soil, at least in part, by ion exchange with clays, absorption, or both.

It is often more convenient and is sometimes necessary to apply the fertilizer by surface broadcasting. In some situations it is highly inconvenient, if not impossible, to turn the fertilizer into the soil by plowing, injection, etc. Thus the fertilizer particles remain on the surface where decomposition products escape directly to the atmosphere. As much as 80 percent of the nitrogen originally added as urea can be lost by volatilization within 24 hours under unfavorable conditions.

This loss has been consistently attributed to the influence of urease enzyme. It was thought that urea volatilization loss was the immediate and, for the most part, unavoidable consequence of urea assimilation by that enzyme. The only solution was thought to be submersion of the particles beneath the soil so that the decomposition products would be exchanged or otherwise absorbed. Thus the use of urea was avoided in preference to other nitrogen-containing compounds where subsurface application was impractical.

Substitution is often both inconvenient and expensive. On a weight basis, urea contains more nitrogen than does any other suitable nitrogen source. Thus the bulk application rate required to obtain a given nitrogen dosage is lower with urea than with many other nitrogen compounds. This makes urea prills, other particles or powders particularly attractive for aerial application to large or inaccessible areas such as commercial timber forests.

It is therefore one object of this invention to provide an improved method of soil fertilization with urea by surface broadcast application. It is another object to provide a method of surface broadcasting urea which reduces nitrogen loss by volatilization in soils containing urease enzyme, even in the absence of urease inhibitors. Another object is the provision of a topical fertilization which reduces urea loss by volatilization even upon standing on the soil surface for 24 hours or more.

In accordance with one embodiment, soils containing urease enzyme are fertilized with urea by surface broadcasting a particle form combination of urea and at least one acid-generating compound in a concentration sufficient to maintain the environment adjacent the urea particles at a pH of about 7 or less. The pH of the environment immediately adjacent the particles does not necessarily reflect soil pH generally. In fact this procedure has the advantage that soil pH need not be changed on a gross basis. I have discovered that it is essential only that the pH in the immediate environment of the particles be maintained at a neutral or slightly acidic level.

The influence of pH around the particle is significant in both basic and acidic soils. This is due to the unique influence of urea itself on its immediate environment. Urea is highly hygroscopic and rapidly absorbs water from the atmosphere or soil. Water uptake substantially reduces the urea melting point and some of the urea may melt or form a highly concentrated solution. Both the melts and solutions are sufficiently basic to create a basic environment around the particle even in acidic soils.

While the mechanism of pH influence on urea volatilization is not known with certainty, I have found that maintaining the pH at a neutral or slightly acidic level markedly reduces urea loss. I have also found, however, that these methods and compositions have utility primarily when urea is applied by surface broadcasting and remains on the surface for at least 24 hours and often as much as 48 hours or more. When the urea particles are turned into the soil by plowing or other means subsequent to or during application, urea loss is less significant apparently due to absorption of decomposition products.

The acid generators are compounds or elements which produce an acidic environment at the soil surface around the particle. In so doing, they eliminate the basicity created by the urea "melt" or solution. Illustrative acid generators are elemental sulfur (which forms sulfuric acid in situ); mineral acids such as sulfuric, nitric, hydrochloric and phosphoric; organic acids, particularly substituted and unsubstituted mono- and dicarboxylic acids having 1 to about 10 carbon atoms per molecule; salts of acids and bases of which the conjugate acid has an ionization coefficient at least 10 percent greater than the ionization coefficient of the conjugate base and which produce a solution having a pH below about 5 in distilled water at a concentration of 0.1 molar; and salts of cations which form hydroxides or carbonates having solubility products below about $10^{-10}$.

The organic acids can be unsubstituted or can be substituted with halo, oxy, hydroxy, sulfo, thiol, sulfato, nitro or amino groups or the like. Illustrative are acetic, succinic, 3-methyl-5,6-dihydroxy-n-hexanoic, 3-chloro-4-nitro-n-pentanoic, 4-thio-n-octanoic, 6-sulfato-2-hydroxy-4-carboxy-n-heptanoic, 7-oxy-4,5-dihydroxy-2-chloro-n-decanoic acids, and the like. Presently preferred organic acids are the unsubstituted acetic, formic, butyric and succinic acids.

Obviously, any combination of all of these acid generators can be used. In fact combinations are sometimes preferred. For instance, the user can incorporate two or more micronutrient metals as acid generating salts such as magnesium sulfate, zinc nitrate, and the like.

Illustrative strong acid salts are those having anions of strong mineral acids such as sulfates, sulfites, nitrates, nitrites, chlorides, fluorides, phosphates, phosphites, and the like. The acids have cations of weak conjugate bases having ionization coefficients at least 10 percent lower than the ionization coefficient of the conjugate acid, i.e., sulfuric, nitrous, hydrochloric, etc. Illustrative cations are ammonium, alkyl ammonium, Zn (+2), Al(+3), Fe(+3), and Ca(+2). Another class of suitable cations which can be combined with the strong acid anions are those which form hydroxides or carbonates having solubility products below about $10^{-10}$. Illustrative are Fe(+2), Al(+3), Mg(+2), and Mn(+2). Obviously the salts and organic and inorganic acids can be used either singly or in combination, either with or without other compounds or sulfur. While there is considerable overlap between these two classes of cations, they are not identical and the effectiveness of each class is attributable to a different cause.

The acid generating compound, or combinations of such compounds, are used in amounts sufficient to reduce the pH of the environment immediately adjacent the urea particle. Generally they are present in amounts adequate to maintain the pH below 7, preferably below 6.5. These amounts correspond to at least about 0.02, usually at least about 0.05, and preferably between about 0.05 and 1 molal equivalent of acid generator per mole of urea. While this ratio is the most relevant parameter, the acid generator concentration can also be represented on a weight basis. Thus the compounds will usually be present in amounts of at least about 1, generally at least about 0.05, and preferably between 0.05 and about 1 weight parts per weight part urea. Obviously the acid generator/urea weight ratios do not correspond exactly to the molal equivalent ratios for any given combination.

The acid generators can be combined with urea in any manner sufficient to produce a particle-form combination in which the several components are closely associated. Thus the sulfur, salts or acids can be incorporated into the urea prills or pellets, or they can be added after particle formation by any one of several coating procedures. Thus the urea particles may be coated or sprayed with concentrated aqueous solutions of the salts, acids or combinations thereof. This practice is not presently preferred since it is complicated by the difficulty of maintaining particle separation in the presence of excess water. A simpler practice involves coating the urea particles with solutions or dispersions of the salts, acids or sulfur in a non-aqueous medium such as a hydrocarbon oil or melted wax. This approach also has its drawbacks since the oil-coated particles tend to agglomerate due to adhesion of the oil film. It is also limited due to the minor amount of acid generating material that can be incorporated by that approach.

The matter of adhesion can be overcome, as disclosed in the literature, by adding minor amounts, e.g., 2 to 20 weight percent, of a finely divided anhydrous clay such as kieselguhr. The clay adheres to the oil film, prevents, or at least minimizes particle adhesion, thereby maintaining free-flowing particles which can be easily distributed. The addition of clay also increases the amount of acid generating compound that can be incorporated although only to a limited extent.

A much preferred approach is that discussed in my copending application Ser. No. 552,226 filed Feb. 24, 1975, incorporated herein by reference. As described in that application, soil amendments can be combined with urea particles by reacting the particles with hydrous calcium sulfate at elevated temperature in the presence of the additive, or by impregnating the additive into the calcium sulfate-urea reaction product thus formed. The reaction product layer formed at the outer surface of the urea particle contains both urea and calcium sulfate and is much more porous and permeable than is the original surface of commercially available prills or pellets. Thus greater amounts of acid generating compounds can be introduced by impregnation with either aqueous or non-aqueous solutions.

However, I presently prefer to combine the acid generator with the calcium sulfate prior to the reaction so that the additive will be encapsulated within the reaction product layer and thereby confined in close proximity to the urea. While the above-identified copending application also mentions the use of this approach with ammonium nitrate particles, that embodiment has no application in the methods involved here. These methods are directed to the volatilization loss of surface broadcast urea, particularly in alkaline soils and in the presence of urease enzyme.

The calcium sulfate should be finely divided, and is preferably a powder and at least partially hydrated. The hydrates include the hemihydrate (plaster of Paris) and the dihydrate (gypsum). A combination of these with anhydrous $CaSO_4$ can also be used. The calcium sulfate is added in amounts corresponding to about 10 weight percent, generally at least about 20 weight percent, and preferably 20 to about 60 percent, based on the dry weight of the final combination. Anhydrous calcium sulfate can also be used with provision for hydration in situ. This can be accomplished by adding sufficient water to the calcium sulfate or to the total reaction mixture, or by steam injection. However, care should be taken to prevent the accumulation of sufficient free water to dissolve or agglomerate the urea particles.

The higher calcium sulfate concentrations should be employed with the higher concentrations of acid generating compounds. The higher dosages can be more easily formulated and handled in compositions of higher calcium sulfate content.

The urea can be either particle-form or powdered. The most convenient sources are the commercially available prills which generally have particle diameters between about 5 and about 30 standard mesh sizes. Other materials such as the major nutrients, e.g., phosphorus and potassium, as well as micronutrients such as boron, iron, magnesium, manganese, copper, zinc and molybdenum, may also be incorporated in forms other than the acid generating compounds referred to above.

Due to the desirability of producing a particle-form material, the starting materials and process conditions should be sufficiently anhydrous to avoid dissolving or melting the urea or producing a cohesive particle which might promote agglomeration. This is not to say that the system must be completely anhydrous. On the contrary, better results are obtained if minor amounts of free water are present initially.

Several factors are involved in establishing the optimum free water content. The water content should be sufficient to convert all of the calcium sulfate to the dihydrate which is believed to be the reactive species. While conversion of calcium sulfate or the hemihydrate is relatively slow at ambient conditions, the reaction proceeds to completion in a matter of several minutes at elevated temperatures, e.g., 100° F. or higher. Thus, the calcium sulfate hydration level must be taken into consideration in determining the amount of free water added to or retained in the system. As a general rule the initial free water level should not exceed about 15 weight percent of the combined dry weight of urea and calcium sulfate.

The optimum water level is best determined empirically. It is influenced to varying degrees by $CaSO_4$ hydration level and impurity content of either the calcium sulfate or urea since impurities may be hydratable and thus compete for available free water. This determination can be made easily by a series of tests using the available calcium sulfate, urea and acid generator, and adding different amounts of water to the reaction mixture either prior to or during heating of reaction temperature. An insufficient water level will be indicated by excessive dusting, incomplete reaction and formation of non-uniform particles. Excess water is indicated by agglomeration or melting and/or dissolving of the urea.

As a general rule the total additive concentration should not exceed the calcium sulfate content. Thus, a product containing, for example, 20 weight percent calcium sulfate should not contain substantially more than 20 weight percent of all other additional additives combined on a dry weight basis. This general rule is not without exception, however, since some of these materials, such as elemental sulfur, actually contribute to particle strength up to a point.

The reaction can be carried out by mixing the several components and heating to a temperature at which the endothermic reaction proceeds. This temperature is indicated by a sharp temperature drop in the solid phase induced by the occurrence of the endothermic reaction, and the evolution of water of hydration from the hydrated calcium sulfate. The reaction usually proceeds at temperatures of about 160° F. or higher. However, it is sometimes desirable to heat the mixture to a temperature at least 210° F. to drive off free water. This temperature should not exceed the temperature at which urea melts or thermally decomposes.

Excess free water can depress the apparent melting point and must be taken into account. Also the reaction requires a minor induction period; initial reaction rate is relatively slow. As a consequence, excessive heating rates should be avoided so that melting or thermal decomposition does not occur before the reaction proceeds to completion. This complication can be simply avoided by heating the mixture to or slightly above the temperature at which reaction is known to take place, e.g., 180° F., and holding that temperature until the reaction is complete. The optimum temperature for any specific combination can be determined by the testing procedure described above, e.g., operating at several different temperatures, either at the same or different initial free water levels, and determining, by observation, the temperature at which reaction takes place and the temperatures that must be avoided to prevent melting and agglomeration. When elemental sulfur is added, it is preferred, although not essential, that the temperature be increased to, or above the sulfur melting point, e.g., about 234° to about 248° F., depending on the form of sulfur used.

Even though this process forms very strong aggregates, it does not cause adhesion of the urea particles themselves. A minor tendency toward agglomeration can be overcome by mechanical agitation, fluidization, or the like.

The other essential aspect of these methods is the environment — the soil — to which the urea particles are exposed in application. As mentioned above, these methods pertain to surface broadcast of urea particles to soils which contain urease enzyme and which create or allow the formation of a basic environment in the immediate vicinity of the urea particle. As a general rule, these soils are basic, having pH levels above 7, often above about 8. Within this group are the so-called calcareous soils. However, even with such basic soils, urea volatilization loss can be reduced markedly by injecting, tilling or otherwise submerging the urea below the soil surface. Thus these methods are of particular benefit for surface applications.

Soil pH, or, more particularly, the existence of conditions which result in volatilization loss can be determined by any one or a combination of several procedures. Soil pH can be evaluated by direct measurement with a pH meter on the moist soil.

The existence of all conditions required to promote volatilization and the severity of loss to be expected with a given soil can also be determined by several procedures. For instance, 100 grams of soil can be mixed with 10 ml distilled water with 1 gram of urea added to the damp surface. This combination is held at 80° F. for 48 hours in a closed container. After this period the occurrence of urea volatilization will be established by analysis of the vapor space overlying the soil or the water phase in contact with the soil, or both, for urea decomposition products, e.g., ammonia and carbon dioxide. The test can be accelerated at higher temperatures. However, contacting temperatures of 80° C. or higher should be avoided since these will result in chemical hydrolysis of urea even in the absence of enzymatic action. Moreover, any comparison of materials or prediction of field application results by this or other procedures, should be performed at comparable temperatures since higher temperatures do accelerate urea loss.

In an alternative procedure, a conventional pH indicator can be incorporated into the mixture and can be titrated with a suitable acid, e.g., hydrochloric, sulfuric, etc. to neutralize decomposition products as they are formed, and maintain a constant system pH.

Another alternative is the lysimeter which has become a standard in the art. This apparatus comprises an enclosure for controlling atmospheric and soil conditions and compositions and can contain plants if desired. In this latter respect the apparatus closely resembles the now popular terrariums. In operation lysimeters approximate the vapor analysis procedure described above. A sample of the soil is placed in the lysimeter along with urea particles and a minor amount of water. The overlying vapor space can be continuously withdrawn and replenished with ambient air. The composition of the withdrawn gas can be continuously monitored for ammonia and $CO_2$ by conventional analytical techniques such as gas chromatography. In the alternative the withdrawn vapor can be passed through a standard dilute acid scrubbing solution for a fixed period such as 24 hours during which the dilute acid will be partially neutralized by basic decomposition products if present. The acid solution is then back titrated with base to determine the extent of neutralization which in turn gives an indication of urea loss.

Similar procedures can be used to determine the change in urea stability obtained with any of the methods described herein. For instance, 100 grams of the desired soil can be distributed in the lysimeter and wetted with 10 ml of distilled water. One gram of the selected urea particles containing the acid generator is then distributed over the surface of the damp soil. The soil and overlying vapor space temperatures are then maintained at 80° F. for 48 hours during which time the vapor space is continuously withdrawn and analyzed for ammonia and $CO_2$ by gas chromatography. Vapor phase analysis enables a much more accurate evaluation than does analysis of the soil water itself since the presence of urea decomposition products in the overlying atmosphere is a direct indication of urea loss. It is not essential that the methods be capable of modifying soil characteristics on a gross basis.

These testing procedures can be used to compare the volatilization loss of pure urea prills to that of prills containing 5 weight percent of ammonium nitrite, zinc sulfate, ammonium phosphate, succinic acid, 4-thio-n-octanoic acid, hydrochloric acid, etc., distributed throughout the urea particles or contained in a surface coating, or both. Comparisons can also be made to particles encapsulated in a reaction product layer of calcium sulfate and urea produced by the methods described above. Illustrative compositions are those containing 20 weight percent calcium sulfate (anhydrous bases), 75 weight percent urea and 5 weight percent of acetic acid, 7-oxy-4,5-hydroxy-2-chloro-n-decanoic acid, sulfuric acid, ammonium sulfate, zinc sulfite, zinc chloride, elemental sulfur, zinc phosphite, or combinations thereof and the like. When the soils tested have the characteristics described above, e.g., basic composition and urease enzyme content, the rate of ammonia and $CO_2$ evolution from the compositions containing acid generating compounds is noticeably lower than that occurring with untreated urea particles. These advantages are apparent at all application rates which, with only rare exceptions, fall within the range of 10 to 600 pounds nitrogen per acre, and generally range from 20 to 300 pounds per acre depending on soil requirements, crop types, etc.

I claim:

1. The method of topically fertilizing soils containing urease enzyme with urea particles under conditions in which a basic environment having a pH of at least about 7 would exist immediately adjacent said particles in the absence of the acid generator hereinafter defined, and minimizing the nitrogen lost by volatilization of said urea, including the steps of surface broadcasting said urea particles on said soil as a particle form combination of urea and at least one acid generator in an amount sufficient to maintain a pH below 7 in the soil immediately adjacent said urea particles, and maintaining (1) said particles on the surface of said soil, and (2) a pH below 7 in said soil immediately adjacent said particles for at least about 24 hours.

2. The method of claim 1 wherein said soil is a basic soil having a pH above 7 and said acid generator is present in said combination in an amount sufficient to generate at least about 0.02 molar equivalents of acid per mole of urea present in said combination and maintain a pH in said adjacent soil of about 6.5 or less.

3. The method of claim 2 wherein said acid generator comprises elemental sulfur in an amount sufficient to generate between about 0.05 and about 1 molal equivalent of acid per mole of said urea.

4. The method of claim 2 wherein said basic soil has a pH above 8 in the absence of said urea particles.

5. The method of claim 4 wherein said acid generator is selected from the group consisting of (1) elemental sulfur; (2) sulfuric, nitric, hydrochloric and phosphoric acids; and (3) mono- and dicarboxylic acids having 1 to about 10 carbon atoms per molecule.

6. The method of claim 5 wherein said urea particles are maintained on said soil surface for at least 48 hours after said surface broadcast application, and said acid generator is combined with said particles in an amount sufficient to prevent the volatilization loss of more than 20 percent of the urea that would otherwise be lost by volatilization within said 48 hours in the absence of said acid generator.

7. The method of claim 1 wherein said acid generator is selected from the group consisting of (1) elemental sulfur; (2) sulfuric, nitric, hydrochloric and phosphoric acids; (3) mono- and dicarboxylic acids having 1 to about 10 carbons; (4) salts of which the conjugate acid has an ionization coefficient at least about 10 percent greater than the ionization coefficient of the conjugate base and which produce a solution having a pH below about 5 in distilled water in a concentration of 0.1 molar; and (5) salts of cations which form hydroxides or carbonates having solubility products below about $10^{-10}$.

8. The method of claim 1 wherein said particles are left on the surface of said soil for at least 24 hours and said acid generator is combined with said particles in an amount sufficient to prevent the loss of more than 10 percent of said urea within 24 hours.

9. The method of claim 1 wherein said urea particles are maintained on the surface of said soil for at least about 48 hours following said surface broadcast application, and the amount of said acid generator combined with said urea is sufficient to prevent the volatilization loss of more than 20 percent of the urea that would otherwise be lost by volatilization within 48 hours in the absence of said acid generator.

10. The method of claim 9 wherein said acid generator is selected from the group consisting of ammonium phosphates, sulfates and fluorides and the nitrates, phosphates, sulfates and chlorides of iron, zinc, copper, magnesium and manganese.

* * * * *